May 5, 1959     M. C. BURK ET AL     2,884,786
NOISE THERMOMETERS

Filed Aug. 7, 1952     6 Sheets-Sheet 1

INVENTORS
M.C. BURK and
D.A. FLUEGEL
BY
Hudson & Young
ATTORNEYS

INVENTORS
M. C. BURK and
D. A. FLUEGEL
BY
Hudson & Young
ATTORNEYS

INVENTORS
M.C. BURK and
D.A. FLUEGEL
BY
Hudson & Young
ATTORNEYS

INVENTORS
M. C. BURK and
D. A. FLUEGEL
BY Hudson & Young
ATTORNEYS

May 5, 1959

M. C. BURK ET AL 2,884,786

NOISE THERMOMETERS

Filed Aug. 7, 1952

POWER SUPPLY
CONNECTORS

INVENTORS
M.C.BURK and
D.A.FLUEGEL
BY

Hudson & Young

ATTORNEYS

United States Patent Office 2,884,786
Patented May 5, 1959

2,884,786
NOISE THERMOMETERS

Marvin C. Burk and Dale A. Fluegel, Bartlesville, Okla., assignors to Phillips Petroleum Company, a corporation of Delaware Application August 7, 1952, Serial No. 303,188

15 Claims. (Cl. 73—359)

This invention relates to noise thermometers. In another aspect, it relates to a method of and apparatus for balancing a bridge circuit used in a noise thermometer.

Where high accuracy is to be obtained in a noise thermometer, very minute quantities of electrical power produced as a result of thermal agitation in a resistor exposed to the temperature to be measured must be amplified to a tremendous degree in order to provide a useable temperature reading. The circuits used must be very carefully and accurately balanced, and we have discovered that the residual capacitance of the temperature sensing element must be compensated for, if a high degree of accuracy is necessary.

It is an object of the invention to provide a noise thermometer of improved construction.

It is a further object to provide a bridge circuit for a noise thermometer which can be quickly and accurately balanced.

It is a still further object to provide circuits of novel design cooperating with the bridge circuit but which are useful in other applications.

It is a still further object to provide a system which is very accurate in the measurement of temperatures at temperature levels where measurements have heretofore been extremely difficult.

Various other objects, advantages and features of the invention will become apparent from the following detailed description taken in conjunction with the accompanying drawings, in which.

Figure 1:
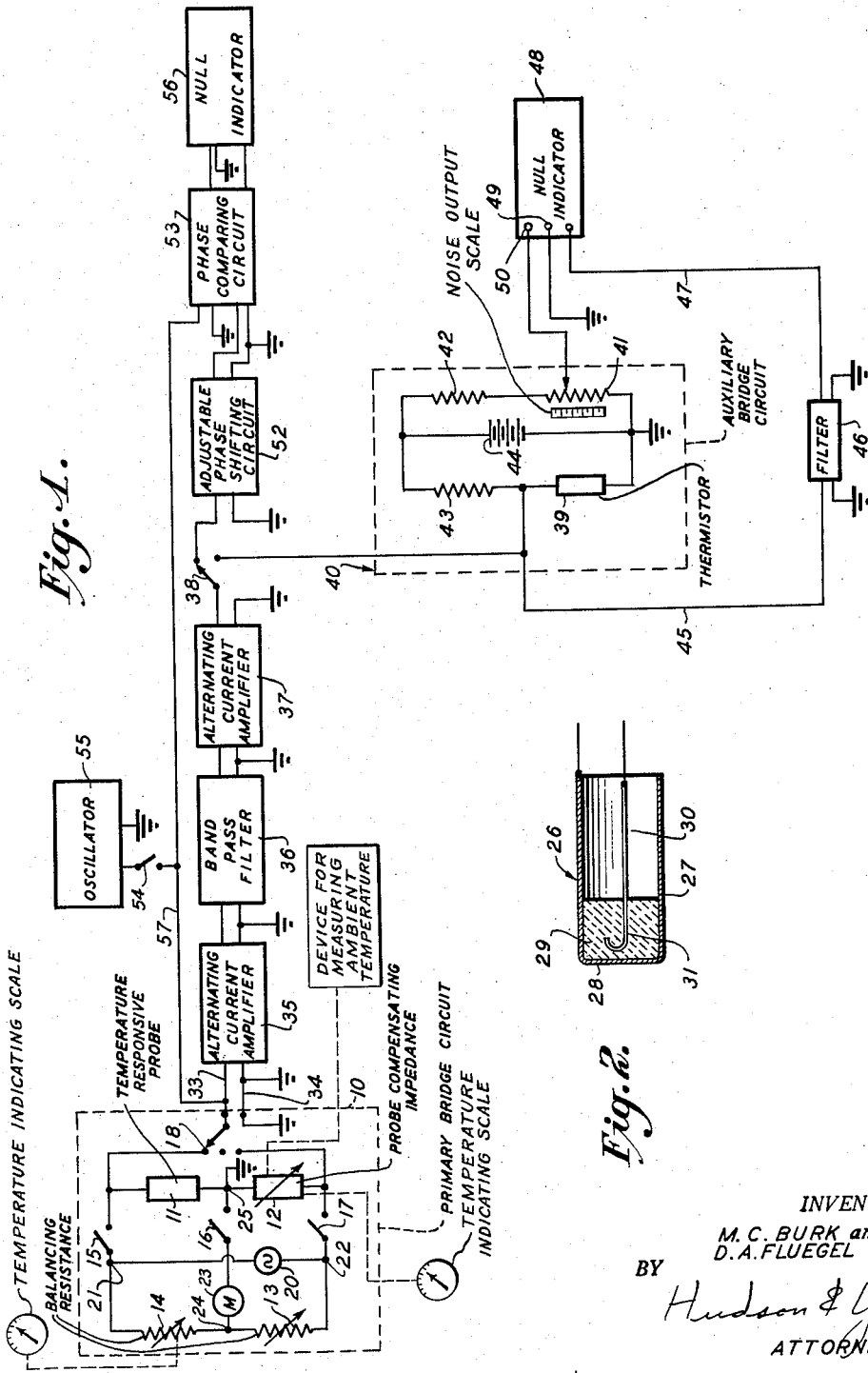
Figure 1 is a block diagram of the noise thermometer of this invention.

Referring to Figure 1, we have shown a primary bridge circuit 10, the arms of which are defined by a temperature responsive probe 11, a probe compensating impedance 12, a first balancing impedance 13 and a second balancing impedance 14. Preferably, impedances 13, 14 are pure resistances, although other components, such as condensers, can be substituted in the broader aspects of the invention. The bridge circuit further includes four switches 15, 16, 17, and 18 and, with switches 15, 16, and 17 closed and switch 18 in neutral position, an alternating current source 20 has one terminal thereof connected to the junction 21 between probe 11 and impedance 14, the other terminal of the source being connected to the junction 22 between impedances 12 and 13. A null indicator, represented by the meter 23, has one terminal thereof connected to the junction 24 between impedances 13, 14 and the other terminal thereof connected to the junction 25 between impedance 12 and probe 11. The junctions 21, 22, 24, and 25, therefore, constitute the four corners of the Wheatstone bridge circuit, it being evident that the alternating current source is connected between one set of opposite corners and the null indicator 23 is connected between the other set of opposite corners.

Figure 2:
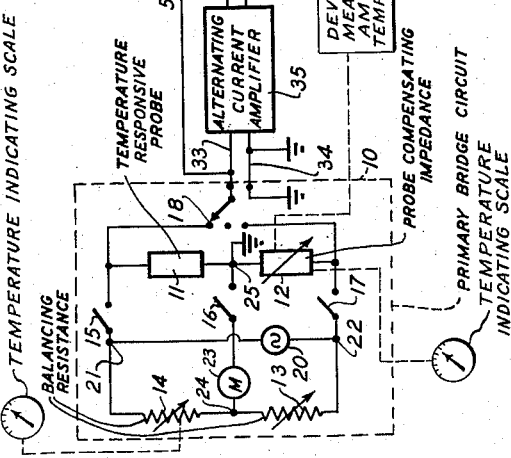
Figure 2 is a vertical sectional view of a probe used as the temperature sensing element.

The probe 11, Figure 2, preferably and advantageously comprises a generally cup shaped shell 26 having cylindrical barrel 27 together with an integral base portion 28 closing one end of the barrel. Mounted within the shell and contacting the base 28 is a generally cylindrical insert 29 formed from refractory material. An axial electrode 30 has a hook shaped inner end 31 which is disposed within the insert 29. The shell can advantageously be formed from refractory metal carbides, such as silica carbide, tungsten carbide and the like, while the insert can be advantageously formed from a refractory metal oxide, such as aluminum oxide, calcium oxide, and the like so that the total resistance of the insert is many times greater than that of the shell. Further details of construction of the probe are set forth in the copending application of Marsden and de Boisblanc, Serial No. 229,026, filed May 31, 1951, now Patent No. 2,710,899, entitled Detector for Thermal Noise Thermometer. A suitable probe is also shown in the copending application of de Boisblanc and Marsden, Serial No. 230,344, filed June 7, 1951, now Patent No. 2,728,836 entitled Temperature Sensing Element.

When exposed to a high temperature, as in a hot gas current, the probe produces a noise output as set forth by the Johnson equation:

$$\overline{e_p^2} = 4KBT_pR_p \quad (1)$$

where $e$ is the noise voltage, K is Boltzmanns constant, B represents the frequency range considered, T is the absolute temperature in degrees Kelvin and R is the resistance. The subscript "$p$" represents the probe 11. Equation (1) also represents the output of compensating element 12 in lieu of probe 11, in which case the subscript "$p$" is replaced by the subscript "$c$" as hereinafter designated.

In balancing steps to be hereinafter described, compensating impedance 12 is so adjusted as to produce a noise output at ambient temperature equal to that produced by the probe 11 at operating temperature. Further, the impedance 12 is so adjusted that its phase angle is equal to the phase angle of the probe, resulting from its inherent distributed capacity. Accordingly, the noise output $$\overline{e_c^2} = 4KBR_cT_c$$

of the compensating impedance is equal to the noise output $$\overline{e_p^2} = 4KBT_pR_p$$

of the probe. That is, at all temperatures:

$$T_p = \frac{R_cT_c}{R_p} \text{ or } T_c = \frac{R_pT_p}{R_c} \quad (2)$$

With the phase angle of the impedance 12 adjusted to equal the phase angle of the probe 11, the following condition prevails when the bridge circuit 10 is balanced:

$$\frac{R_c}{R_p} = \frac{r_2}{r_1} \quad (3)$$

where $r_1$ is the resistance of impedance 14 and $r_2$ is the resistance of impedance 13. In making the measurement, the temperature of impedance 12 is measured, as by a thermometer, and the setting of resistance 14 is so adjusted that the resistance is proportional in the circuit to $T_c$. That is, $T_c \sim r_1$.

As a result, the temperature of the probe 11 is equal numerically to the reading $r_2$ of impedance 13 when the bridge is in a balanced condition. Thus, $$\frac{R_c}{R_p} = \frac{r_2}{r_1} = \frac{r_2}{T_c} = \frac{r_2 R_c}{R_p T_p} \quad (4)$$

That is:

$$r_2 = T_p \quad (5)$$

In practice, with current source 20 connected to the bridge, the temperature of compensating impedance is measured, and a dial connected to resistance 14 is numerically set to this temperature. A dial on impedance 13 is then moved until the bridge is balanced, at which time the dial reading indicates directly the probe temperature. On a convenient scale, a resistance change of fifty ohms corresponds to a change in temperature of 1° K. so that impedance 14 has a value in the neighborhood of 13,000 to 18,000 ohms (270–370° K.), while impedance 13 has a value in the range of fifty ohms multiplied by the number of degrees K. to which the probe is exposed.

In balancing the bridge, impedance 12 is first adjusted at ambient temperature until the noise produced thereby is equal to the noise produced by the probe 11 at operating temperature. Thus, after such balancing, the condition expressed in Equation 2 is satisfied. Further in accordance with the invention, the reactive component of impedance 12 is so adjusted as to balance out the reactive component resulting from the residual capacitance of the probe 11 in the primary bridge circuit 10. Finally, these balancing steps and the described measuring step are all carried out by moving a single switch sequentially to several positions and making suitable adjustments of the circuit components at each switch position.

To this end, we have provided the switch 18 which cooperates with two leads 33 and 34 constituting a portion of the input circuit of an alternating current amplifier 35, hereinafter referred to as a preamplifier. Lead 34 is grounded and lead 33 is connectible, in accordance with the position of switch 18, to a neutral middle position, an upper position wherein the probe 11 is connected in the input circuit of amplifier 35, or a lower position where compensating impedance 12 is connected in the input circuit of amplifier 35. The output of amplifier 35 is fed to a band pass filter 36 having a frequency characteristic such that the desirable noise voltages are selectively passed therethrough with satisfactory attenuation of signals at power line frequencies, which may be picked up by the probe 11. Preferably and advantageously, the pass band of filter 36 can be from 10 to 50 kilocycles. The output of band pass filter 36 is fed to an alternating current amplifier 37, hereinafter called the final amplifier, and the output of this unit is fed to a switch 38.

When the noise output of the compensating impedance is adjusted so as to equal that of the probe, switch 38 is in its lower position and the output of the amplifier is, therefore, impressed upon a thermistor 39 forming a part of an auxiliary circuit 40. Preferably and advantageously, the temperature of the thermistor is maintained constant at, for example 150° F. as by a thermostatically controlled heater unit, not shown. The bridge circuit is made up of a potentiometer 41 in an arm of the bridge adjacent thermistor 39 together with two fixed resistances 42 and 43 defining the other two arms of the bridge. A suitable direct current source 44 has one terminal connected to the junction between fixed resistances 42, 43 and its other terminal connected to the junction between thermistor 39 and potentiometer 41, the latter junction being grounded. A lead 45 extends from the junction between fixed resistor 43 and thermistor 39 to the input circuit of a filter 46, the output of which is fed by a lead 47 to one terminal of a null indicator 48, the indicator having a common terminal 49 and a terminal 50 connected to the contactor of potentiometer 41. Null indicator 48 is of the type which alternately compares the voltage between one input terminal and ground with the voltage between the other input terminal and ground so that a balanced circuit condition prevails when these voltages are equal through a number of alternations or operating cycles. The detailed circuit of the indicator 48 will be hereinafter described in detail.

With the probe 11 at operating temperature and impedance 12 at ambient temperature, switches 15, 16, and 17 are opened, and switch 18 is moved to its upper position so that the noise voltage produced by the probe is amplified and filtered by the amplifier means 35, 36, and 37. This amplified and filtered voltage is impressed upon thermistor 39 and produces a resistance change therein representative of the noise voltage or power. Thereupon, potentiometer 41 is adjusted until calibrating bridge circuit is balanced, as shown by indicator 48, it being noted that the alternating output of the amplifier cannot pass to the indicator 48 due to the action of filter 46. With the bridge in balanced condition, the setting of potentiometer 41 is representative of the noise output of the probe 11. In effect, the quantity representative of the noise output is stored by potentiometer 41.

After the described balancing step, switch 18 is moved to its lower position so that the noise voltage produced by impedance 12 is fed through the amplifier means to bridge 40. Thereupon, the resistance of impedance 12 is adjusted until the bridge circuit is balanced, as shown by indicator 48. With the bridge balanced, it will be evident that the noise output of compensating impedance 12 is equal to the noise output represented by the setting of potentiometer 41 and, therefore, to the noise output of the probe 11. It will be understood that the noise voltages developed in the amplifier circuits are balanced out as a result of the aforementioned balancing procedure. In some cases, sufficient accurate results can be obtained even if the residual capacitance of the probe is neglected. In such cases, switch 18 can be moved to its neutral position, and the balancing of primary bridge circuit 10 can be carried out to determine the probe temperature in the manner hereinbefore described.

For accurate work, however, the reactance of the probe should be balanced out by a reactance adjustment to compensating impedance 12. To accomplish this purpose, switch 38 is moved to its upper position so that the output of final amplifier 37 is fed to an adjustable phase shifting circuit 52. The output of circuit 52 is fed to one input circuit of a phase comparing circuit 53, the other input of which is coupled by a switch 54 to an oscillator 55. Circuit 53 produces a zero output when the signals thereto are 90 degrees out of phase, and circuit 52 produces a 90 degree phase shift plus or minus an incremental phase shift determined by the constants of the circuit. As a result, circuit 53 produces an output representative of the difference between phase of the oscillator signal and the phase of the input signal to circuit 52 as modified by the incremental phase shift produced by circuit 52. When this phase difference is made 90 degrees by adjustment of circuit 52, as indicated by a null indicator 56 connected to the output of circuit 53, the phase angle of the voltage produced by circuit 52 is ninety degrees out of phase with respect to oscillator voltage and, therefore, circuit 53 produces a zero output. The signal from oscillator 55 can also be fed by a lead 57 to input circuit lead 33 of preamplifier 35 and thereby impressed upon probe 11 or impedance 12 depending on the position of switch 18.

With switch 38 in its upper position, and switch 54 closed, switch 18 is moved to its upper position so that probe 11 is connected to the input circuit of preamplifier 35. The residual capacitance of the probe produces a representative phase shift in the signal produced by oscillator 55 across the probe. After amplification in units 35, 37 and filtering in unit 36, the signal passes through phase shifting circuits 52 to the comparing circuit 53. The circuit 52 is adjusted until null indicator 56 indicates a balanced condition, at which time the setting of phase shifting circuit 52 is representative of the phase shift produced in the oscillator signal by the residual capacitance of probe 11 and, therefore, is representative of this residual capacitance. In effect, a quantity representative of this phase shift is stored in circuit 52.

Thereupon, switch 18 is moved to its lower position so that impedance 12 is connected to the input circuit of preamplifier 35. The resulting amplified filtered signal from final amplifier 37 passes through circuit 52 to comparing circuit 53. Assuming that an unbalanced condition is shown by null indicator 56, the reactance of impedance 12 is adjusted until a null indication is obtained. After this adjustment, it will be evident that the same phase shift is produced in the oscillator signal by impedance 12 as by probe 11. Accordingly, phase shift produced by the residual capacitance of the probe is equal to the phase shift produced by impedance 12. Thereupon, the noise output balancing steps with switch 38 in its lower position are repeated, after which the actual temperature measurement is taken in the manner previously described.

Figure 3:
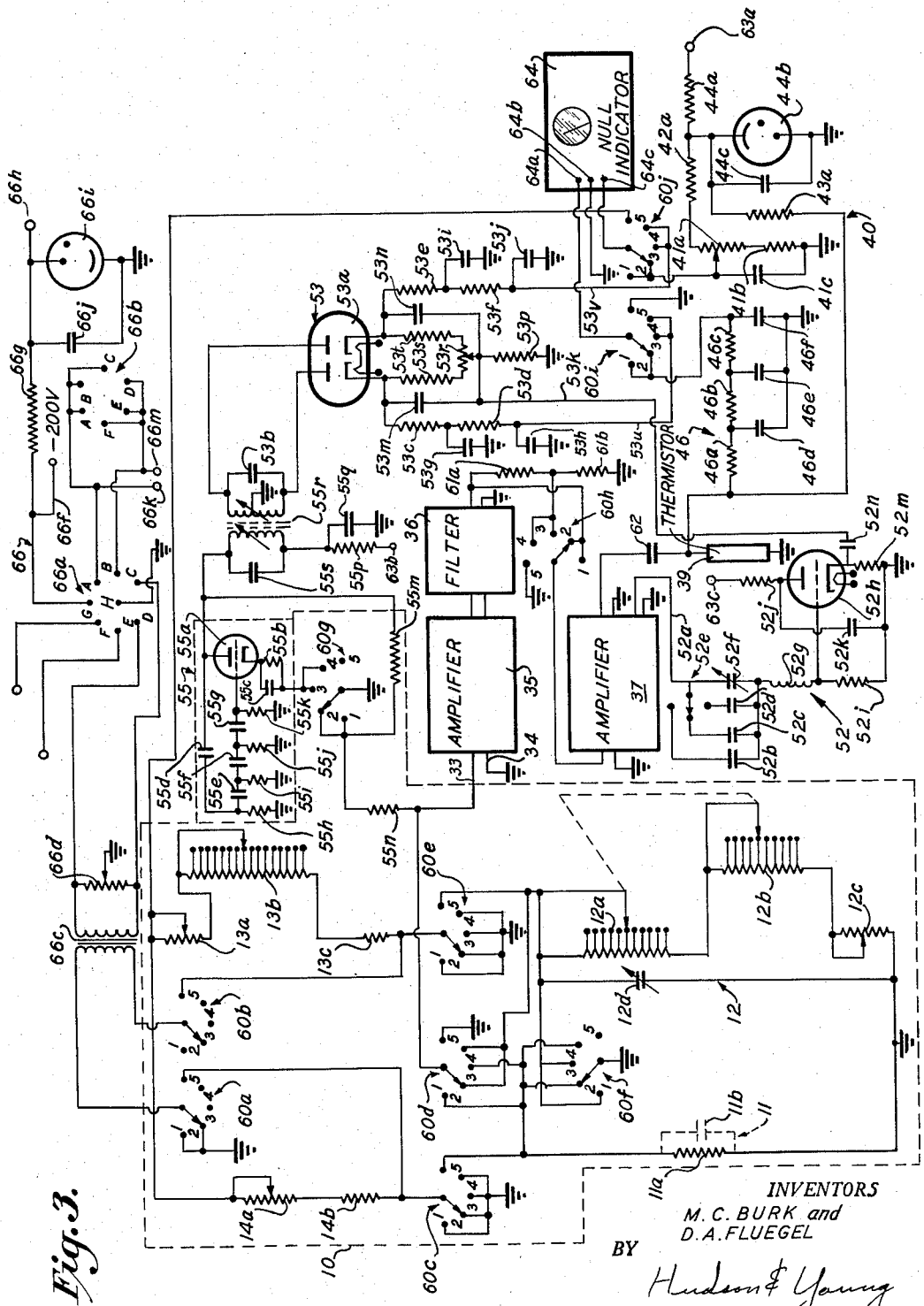
Figure 3 is a schematic circuit diagram showing certain details of the circuits of Figure 1.

In Figure 3, we have shown a more detailed circuit of the noise thermometer shown in block diagram by Figure 1. With this circuit, the described noise voltage balancing steps and reactance balancing steps are carried out successively, together with the actual measurement, by moving a multi-position switch successively to several different positions. The switch is composed of several ganged sections which are indicated on the drawing by reference numerals 60a to 60j, inclusive.

The components of primary bridge circuit 10 are shown in detail and it will be noted that the probe is represented by a resistance 11a shunted by a condenser 11b representing the residual capacitance of the probe. The probe compensating impedance 12 is made up of three series connected resistance sections 12a, 12b, and 12c shunted by a variable condenser 12d. Resistance sections 12a, 12b are adjustable in a stepwise manner, unit 12a having larger resistance steps to serve as a coarse adjustment, and unit 12b having smaller steps to serve as a fine adjustment. In some cases sections 12a and 12b are incorporated into a single unit. Variable resistance 12c serves as the finest or vernier adjustment. These resistance units permit the accurate adjustment of the resistance of impedance 12 over a wide range of resistance values to produce a noise output at ambient temperature equal to that of the probe. Variable condenser 12d permits the capitance, i.e., the reactance, of the impedance 12 to be varied as desired.

The balancing impedance 14 is shown as a variable resistance 14a connected in series with a fixed resistance 14b. Where a temperature scale of 50 ohms per degree K. is used, resistance 14b may have a value of 13,000 ohms and resistance 14a may vary between 0 and 5,000 ohms. This provides a range of ambient temperatures on the dial, not shown, attached to resistance 14a of from 273.12 to 373.12° K. The balancing impedance 13, by which the final reading is made, consists of three series connected resistance units, namely, a variable resistance 13a, a resistor 13b adjustable in a stepwise manner, and a fixed resistor 13c.

The resistance 13c has a suitable value, corresponding to 273.12° K. to cause balancing resistance 13 to read in degree centigrade. Variable resistance 13a can have a value of from 0 to 5,000 ohms so that its dial, not shown, reads over a range of 100° K. Each step of resistor 13b can have a value of 5,000 ohms, corresponding to an interval of 100° K., thereby providing a wide range without changing the value of resistor 13c.

Amplifier input lead 33 extends from the common contact of switch section 60d to the input circuit of the amplifier 35 which is connected, as in Figure 1, to the filter 36 and final amplifier 37. It will be noted that the output of filter 36 is fed directly to contacts 1 and 2 of switch section 60h and also to a voltage divider made up of two fixed resistances 61a and 61b, the junction between these resistances being connected to switch sections 3 and 4. Switch section 5 is grounded, and the common terminal of the switch leads to the input of final amplifier 37. Accordingly, with the switch in positions 1 and 2 the filter 36 is directly coupled to amplifier 37; with the switch in positions 3 and 4, the amplitude of filtered signal is reduced by voltage divider 61a and 61b and then fed to the amplifier 37; and with the switch in position 5, the output of the filter is grounded.

Final amplifier 37 has two sets of output terminals. The upper set of terminals passes the amplifier output through a coupling condenser 62 to one terminal of the thermistor 39 (see Figure 1) the other terminal of which is grounded. In this manner, the amplifier output is impressed upon the thermistor. As previously described, the thermistor is connected in the bridge circuit 40 of Figure 1, the other components of which comprise fixed resistance 43a, fixed resistance 42a and potentiometer 41a, the latter component being connected to one terminal of a fixed resistance 41b, the other terminal of which is connected through ground to the thermistor 39. It will be noted that a bypass condenser 41c is connected between the contactor of potentiometer 41a and ground.

The current source 44 of Figure 1 is represented in Figure 3 by a positive power supply terminal 63a connected through a voltage dropping resistor 44a to the junction between resistances 42a and 43a, this junction also being grounded through a voltage regulator tube 44b connected in parallel with a bypass condenser 44c.

We have also shown a null indicator 64 which is switched through sections 60i, 60j to various circuit positions so that it corresponds to the meter 23, indicator 48, and indicator 56 of Figure 1. With switch sections 60i, 60j in position 1 or 2, it will be evident that terminal 64a of the indicator is connected through section 60i to the output of filter 46 which is made up of three series connected resistances 46a, 46b, and 46c cooperating with grounded filter condensers 46d, 46e, and 46f, the input of the filter being connected to the junction between thermistor 39 and bridge resistance 43a. The common terminal 64b of the null indicator is grounded and the other input terminal 64c is connected through switch section 60j to the contactor of potentiometer 41a. It will be evident, therefore, that the output of final amplifier 37 is fed to the bridge circuit 40, filter 46 and null indicator in the manner described in connection with Figure 1 with the switch in position 1 or 2.

Proceeding now to the reactance balancing portion of the circuit, it will be noted that the oscillator 55 includes a triode oscillator tube 55a, the cathode of which is connected through a bias resistor 55b shunted by a bypass condenser 55c to positions 3 and 4 of switch section 60g, the common terminal of which is grounded. The anode of tube 55a is connected back to the control grid through a phase shift network consisting of series condensers 55d to 55g, inclusive, having grounded fixed resistances 55h to 55k connected to the junctions therebetween. The anode of the tube is further connected to amplifier input lead 33 through series resistances 55m and 55n, the junction between these resistances being connected to terminals 1 and 2 of switch section 60g. Power is supplied to the oscillator tube from a positive power supply terminal 63b through a fixed resistance 55p provided with a bypass condenser 55q. The oscillator output is impressed upon the primary winding of a transformer 55r connected in parallel with a condenser 55s.

This transformer couples the oscillator to the phase comparing circuit 53 which includes a dual diode 53a having its anodes connected to the respective terminals of the secondary winding of transformer 55r, this winding having a grounded center tap and a fixed condenser 53b connected in parallel therewith. The cathodes of dual 53a are connected to positions 3 and 4 of the respective switch sections 60i, 60j through networks comprising series connected resistances 53c, 53d and 53e, 53f cooperating with sets 53g, 53h and 53i, 53j of bypass condensers. The cathodes are also connected to an input lead 53k through the respective coupling condensers 53m, 53n. This lead is connected to ground through a fixed resistance 53p and to the contactor of a potentiometer 53r, the fixed terminals of which are connected through resistances 53s and 53t to the respective cathodes of dual diode 53a.

It will be evident that unit 53 compares the phase of the signals impressed upon the anodes of dual diode 53a from transformer 55r and oscillator 55 with a phase of the signal impressed upon the cathodes of the tubes from lead 53k, a balanced signal output appearing at leads 53u, 53v when these signals are 90 degrees out of phase. Since phase shifting circuit 52 produces a 90 degree phase shift plus or minus an incremental phase shift determined by the circuit constants thereof, a balanced signal indicates that the phase of the oscillator signal is equal to the phase of the input signal to circuit 52 plus or minus the incremental phase shift produced by the phase shifting circuit. When the signals are not 90 degrees out of phase, there is a difference in the voltages appearing at leads 53u and 53v. The input voltage supplied to lead 53k is derived from adjustable phase shifting circuit 52 which, in turn, is fed by the lower output terminals of final amplifier 37.

Phase shifting circuit 52 is, therefore, fed by an output lead 52a of final amplifier 37 and includes a set of condensers 52b, 52c, and 52d one of which is selected and placed in series with lead 52a by a switch 52e, thereby providing a coarse adjustment. A smaller variable condenser 52f connected in parallel with the condenser set provides a fine adjustment. The selected condensers are connected through an inductance 52g to the control grid of a triode 52h having a grounded grid resistance 52i. The anode of this tube is connected to a positive power supply terminal 63c through a voltage dropping resistor 52j and to ground through the bypass condenser 52k. The cathode of the tube is connected to ground through a bias resistor 52m and to lead 53k of phase comparing circuit 53 through a coupling condenser 52n. Thus, the signal appearing at the lower output terminals of final amplifier 37 is shifted in phase 90 degrees by circuit 52 plus or minus an amount determined by the setting of one of the condensers 52b, 52c, or 52d and the setting of condenser 52f, the phase shifted signal thereupon passing to lead 53k and the input of phase comparing circuit 53.

In Figure 3, we have also shown a portion of a power supply circuit 66. This circuit includes an octal socket 66a and a six-prong socket 66b. Terminal H of socket 66a is grounded and an alternating voltage is impressed across terminals C and D which are connected to the primary winding of a step down transformer 66c, the winding being shunted by a potentiometer 66d, the contactor of which is grounded. The secondary winding of this transformer is connected to the common terminals of switch sections 60a and 60b. Terminal E of socket 66a is a positive power supply terminal which is connected to positive power supply terminals 63a, 63b, and 63c by suitable leads, not shown. Terminal F of socket 66a is a higher voltage positive power supply terminal which is connected as required to the amplifier circuits. Terminal G is a negative bias terminal and supplies a negative bias voltage at a terminal 66f as required in the amplifier circuits, this terminal also being connected through a resistance 66g to a bias supply terminal 66h, this terminal having voltage regulator tube 66i shunted by a condenser 66j attached thereto. All the terminals of socket 66b and terminals A and B of socket 66a supply filament power to terminals 66k and 66m.

In operation, with the switch in position 1, the probe 11 is connected to the input circuit of preamplifier 35 through switch section 60d, the amplifier input circuit and ground, the oscillator tube 55a being deenergized due to its open cathode circuit at switch section 60g. The amplified filtered noise output of the probe passes from the upper output terminals of final amplifier 37 to the bridge 39, 41a and 41b, 42a, and 43a, the bridge output being developed across null indicator 64 which is connected to two opposite corners of the bridge through switch sections 60i and 60j. Thereupon, the bridge 40 is balanced by adjustment of potentiometer 41a so that the setting of this potentiometer is representative of the noise output of the probe.

Next, the switch is moved to position 2. Thereupon, balancing impedance 12 is connected to the input circuit of preamplifier 35 through switch section 60d and ground, the probe being grounded at switch section 60f. This supplies the noise output generated by the balancing impedance to the bridge 40 through the amplifier and filter circuits. Thereupon, resistance units 12a, 12b, and 12c are adjusted until the bridge 40 is again balanced, as indicated by unit 64. At this time, the noise output produced by the balancing impedance is the same as the noise output produced by the probe, it being understood that the setting of potentiometer 41 is not changed during this second step.

Next, the switch is moved to the position 3, thereby connecting the probe through switch section 60d to the input circuit of amplifier 35. Oscillator 55 is energized through switch section 60g so that a portion of the oscillator signal is applied to the probe through resistances 55m and 55n, another portion of the oscillator output being supplied to the phase comparing circuit 53 through transformer 55r. The residual capacitance of the probe produces a phase shift in the oscillator signal and this phase shifted signal passes through the amplifier means, and phase shifting circuit 52 to the input lead 53k of comparing circuit 53. Further, at this time, null indicator 64 is connected to output leads 53u, 53v of the phase comparing circuit through switch sections 60i and 60j, respectively. Thereupon, switch 52e of the phase shifting circuit and vernier condenser 52f are adjusted until the output of the phase comparing circuit is balanced, thus indicating that the oscillator signal is 90 degrees out of phase with the signal impressed upon lead 53k from the phase shifting circuit. At this time, it will be evident that the incremental phase shift produced by circuit 52 is equal to the phase shift in the oscillator signal produced by the residual capacitance of the probe.

Next, the switch is moved to position 4 so that balancing impedance 12 is connected to the input circuit of amplifier 35 through switch section 60d and ground, the other circuit connections remaining unchanged. Condenser 12d is adjusted until a null indication is produced by unit 64, thereby indicating that the phase shift produced in the oscillator signal by condenser 12d is equal to that stored in the phase shifting network during the third step, it being understood that circuit 52 is not adjusted during this step. That is, at this time, the phase angle of condenser 12d is equal to the phase angle of the probe. The circuit is again adjusted, by repeating steps 1 and 2, to insure that the noise output of the compensating impedance 12 is equal to that of the probe 11, before proceeding to the actual temperature measurement step.

In making the temperature measurement, the switch is moved to position 5. This establishes the primary bridge circuit of Figure 1. The bridge circuit extends from the probe through switch section 60c, the reference temperature responsive impedance 14, balancing impedance 13, switch section 60e and probe compensating impedance 12. Alternating current (preferably 60 cycles, 4 volts) is supplied to the bridge from transformer 66c through switch section 60a to the junction between the probe 11 and impedance 14, and through the switch section 60b to the junction between compensating impedance 12 and balancing impedance 13. The null indicator is connected through ground at position 5 of switch section 60i to the junction between probe 11 and compensating impedance 12 and through position 5 of switch section 60j to the junction between balancing impedance 13 and temperature responsive impedance 14. It will be noted that the amplifier is disconnected at switch section 60d and the oscillator is disabled at switch section 60g. Thereupon, the temperature of the compensating impedance 12 is measured and the dial on balancing impedance 14 is set to indicate this temperature. The conditions in the bridge circuit are now as indicated in Equations 4 and 5 so that the probe temperature is at once available by adjusting units 13b and 13a until the bridge is balanced and then noting the resistance indicated by the setting of resistor 13b and the reading of dial 13a.

Figure 4:
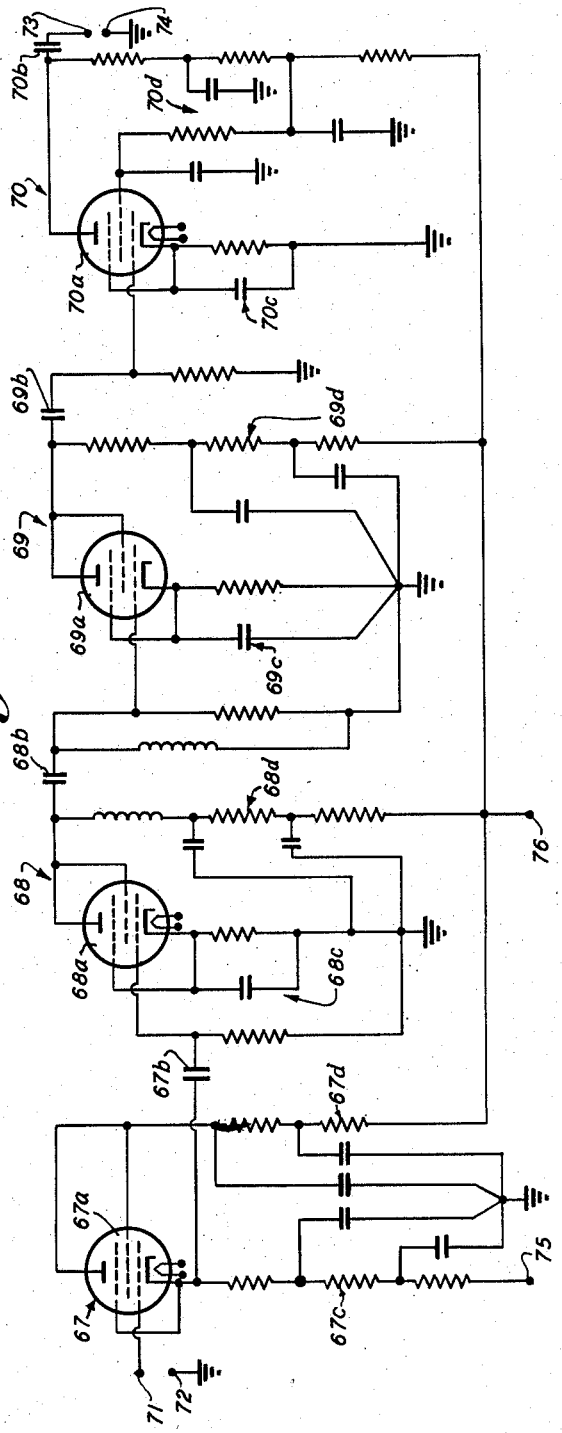
Figure 4 is a schematic circuit diagram of the preamplifier.

In Figure 4, we have shown the detailed circuit of the alternating current preamplifier 35, this unit comprising four stages 67, 68, 69, and 70 of resistance coupled amplification. One input terminal 71 is connected to the control grid of the first amplifier tube 67a, the other input terminal 72 being grounded. The cathode of tube 67a is coupled to the input circuit of tube 68a in stage 68. The anode circuit of tube 68a is coupled to the control grid of a tube 69a in stage 69 and the anode of this tube, in turn, is coupled to the control grid of a tube 70a in stage 70, the anode of this tube being coupled to one output terminal 73, the other output terminal 74 being grounded. Stage 67 has a resistance-capacitance coupling unit 67b, stage 68 has an inductance-capacitance coupling unit 68b, and stages 69, 70 have resistance-capacitance coupling units 69b and 70b, respectively. The respective stages are further provided with resistance-capacitance units 67c to 70c in their cathode circuits and resistance-capacitance filters 67d to 70d in their anode and screen grid circuits. Suitable operating potentials are supplied to a negative bias terminal 75 and a positive power supply terminal 76 from terminals shown on Figure 3 which, in turn, are connected to a power supply unit in the manner hereinafter described.

Figure 5:
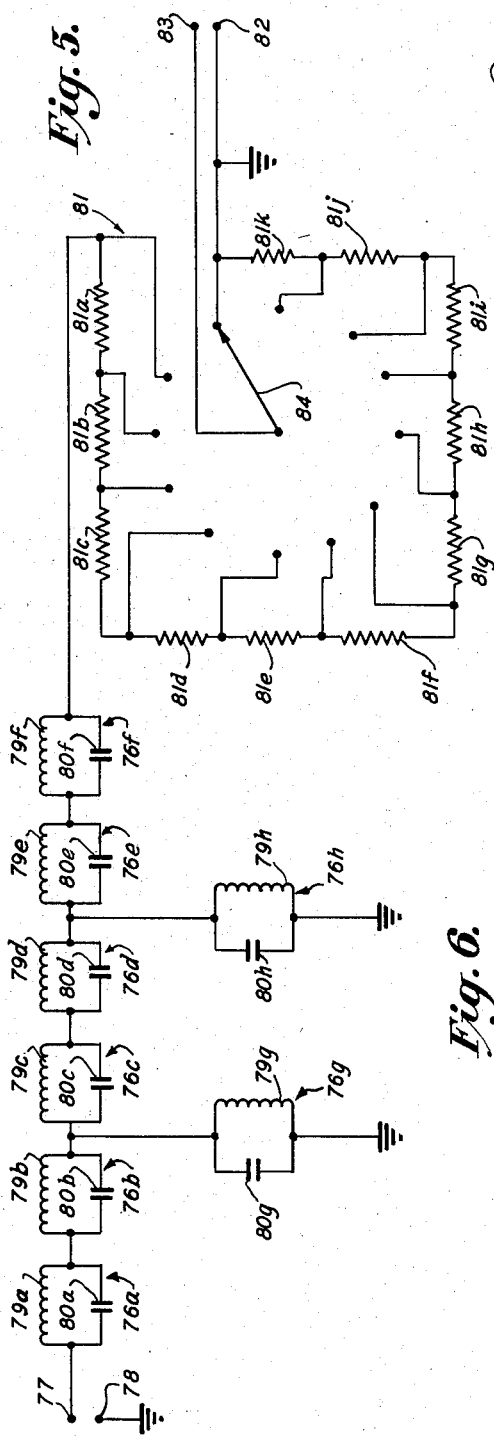
Figure 5 is a schematic circuit diagram of the filter of Figure 1.

Referring now to Figure 5, we have shown the detailed circuit of the band pass filter 36 of Figures 1 and 3. In this figure, six capacitance-inductance units 76a to 76f, inclusive, are connected in series, unit 76a being connected to one input terminal 77, and the other input terminal 78 being grounded. Each unit includes an inductance 79 and a condenser 80 connected in parallel therewith, the inductances and condensers being indicated by letters corresponding to their respective associated coil units. An inductance-capacitance unit 76g consisting of an inductance 79g having a condenser 80g connected in parallel therewith extends from the junction between units 79b, 79c to ground, while an inductance-capacitance unit 76h consisting of an inductance 79h and a condenser 80h connected in parallel therewith extends from the junction between units 79d and 79e to ground. From unit 76f, the circuit extends through a stepped resistor 81 composed of series connected sections 81a to 81k to ground at an output terminal 82. The other output terminal 83 can be connected, as desired, to the junction between any desired pair of resistances by a contact arm 84.

As previously stated, the filter is intended to pass a band of frequencies between 10 and 50 kilocycles. To this end, the various circuit components can have the values indicated in the following table:

| Part | Value | Part | Value |
| --- | --- | --- | --- |
| 79a | 25. millihenrys. | 76g | .00253 microfarad. |
| 79b | 3.65 millihenrys. | 76h | .00253 microfarad. |
| 79c | 300 millihenrys. | | |
| 79d | 14.9 millihenrys. | 81a | 300 ohms. |
| 79e | 3.65 millihenrys. | 81b | 270 ohms. |
| 79f | 25.0 millihenrys. | 81c | 240 ohms. |
| 79g | 20.3 millihenrys. | 81d | 220 ohms. |
| 79h | 20.3 millihenrys. | 81e | 180 ohms. |
| | | 81f | 150 ohms. |
| 76a | .014 microfarad. | 81g | 150 ohms. |
| 76b | .002 microfarad. | 81h | 120 ohms. |
| 76c | .0034 microfarad. | 81i | 120 ohms. |
| 76d | .000173 microfarad. | 81j | 100 ohms. |
| 76e | .002 microfarad. | 81k | 750 ohms. |
| 76f | .014 microfarad. | | |

It will be understood that the attenuation of the filter can be adjusted by movement of switch arm 84 to different positions, as desired.

Figure 6:
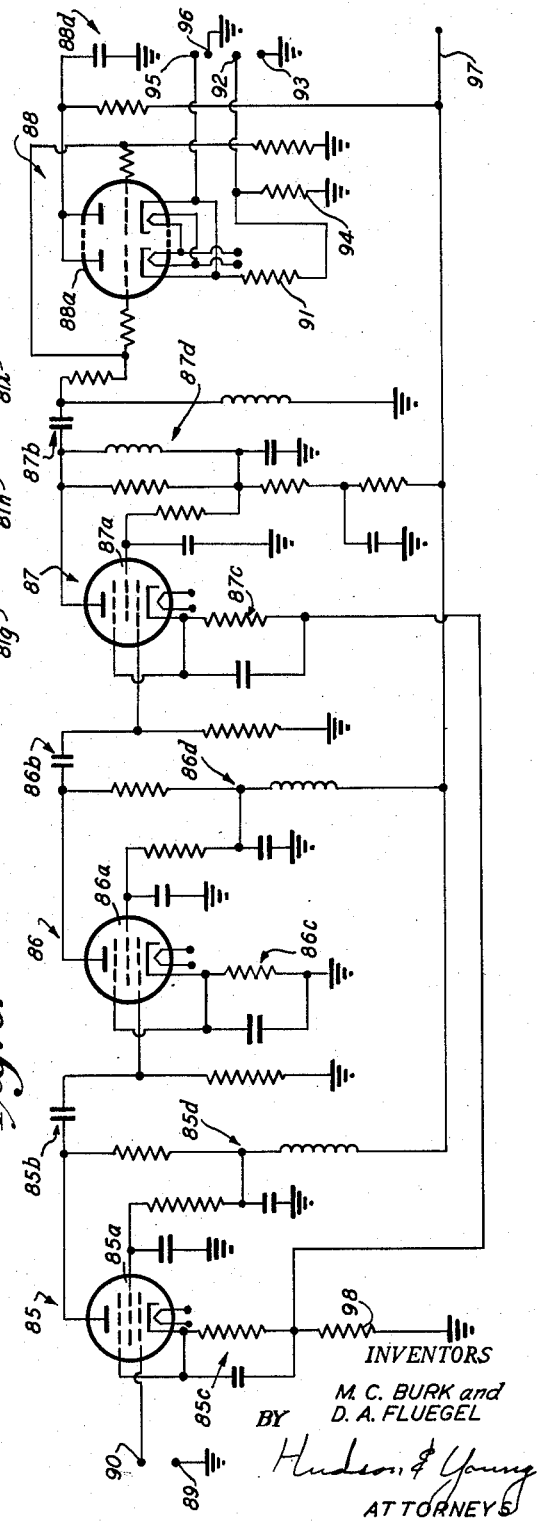
Figure 6 is a schematic circuit diagram of the final amplifier.

Referring now to Figure 6, we have shown the detailed circuit of the final alternating current amplifier 37 of Figures 1 and 3. This unit includes four stages 85, 86, 87, and 88 including tubes 85a to 88a, respectively, tubes 85a to 87a being pentodes and tube 88a being a dual triode with corresponding elements connected together to provide a greater power output. One input terminal 89 is grounded and the other input terminal 90 is connected to the control grid of tube 85a. Each tube has its anode coupled to the input of the next succeeding stage, with the exception of stage 88. In this stage, the cathode is connected through a fixed resistance 91 to one terminal 92 of lower set of output terminals, the other terminal 93 of this set being grounded, and a grounded fixed resistance 94 is connected to output terminal 92. The cathode of tube 88a is also connected directly to one terminal 95 of an upper set of output terminals, the other terminal 96 of this set being grounded. Tubes 85a, 86a, and 87a are provided, respectively, with resistance-capacitance coupling units 85b, 86b, and 87b, resistance-capacitance cathode bias networks 85c, 86c, and 87c, and decoupling networks 85d, 86d, and 87d which lead to a common power supply terminal 97 secured to a power supply connection as illustrated in Figure 3. The cathode of tube 87a is connected through network 87c to the junction between network 85c and a grounded fixed resistance 98, thereby providing degenerative feed back which improves the stability of operation of the amplifier.

Figure 7:
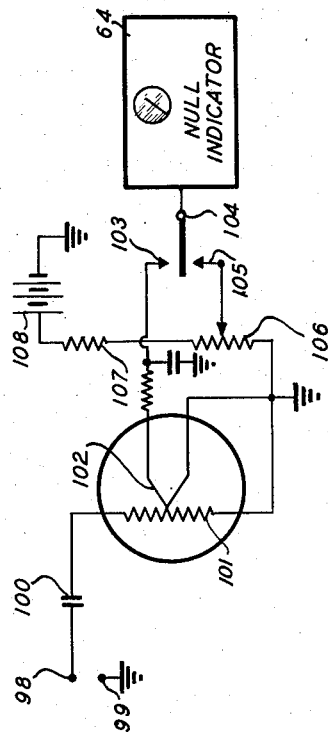
Figure 7 is a schematic circuit diagram of a modification of the invention.

Referring now to Figure 7, we have illustrated an alternative bridge circuit which can be substituted for the bridge 40 of Figure 3. When this circuit is utilized, the upper output terminals of amplifier 37, Figure 3, are connected to the respective input terminals 98 and 99 of Figure 7. Terminal 99 is grounded and terminal 98 is connected through a coupling condenser 100 and a fixed resistance 101 to ground. A thermocouple 102 is thermally connected to the resistance 101 and the electromotive force generated in the thermocouple by heat representing the energy of the amplifier output dissipated in resistance 101 is transmitted to a contact terminal 103 with which cooperates a vibrating reed 104 forming a part of null indicator 64. Also cooperating with the reed 104 is a contact 105 which is connected to the contactor of a potentiometer 106, the fixed terminals of this potentiometer being connected in series with a fixed resistor 107 and a battery or other direct current source 108.

In balancing the circuit of Figure 3 so as to equalize the thermal noise generated by compensating impedance 12 with the thermal noise generated by probe 11, the amplified and filtered output representative of thermal noise generated by the probe first is applied to resistance 101. The power thereby dissipated in this resistor heats thermocouple 102 and generates a potential which is representative of the thermal noise produced by the probe. Null indicating device 64 compares this voltage with the voltage at the contactor of potentiometer 106, the potentiometer being adjusted until a balanced condition is obtained, at which time the potential developed by the thermocouple is equal to the potential between the contactor of the potentiometer and ground.

Thereupon, the amplifier input circuit is transferred from the probe to the probe compensating impedance, and the latter unit is adjusted until the circuit of Figure 7 is again in a balanced condition as indicated by unit 64. At this time, the voltage developed by thermocouple 102 responsive to heating of fixed resistance 101 by the amplified noise voltages from the balancing impedance is equal to the stored voltage between the contactor of potentiometer 106 and ground representing the noise output of the probe. That is, the noise output of the probe compensating impedance is equal to that of the probe, the same result as obtained with the bridge circuit 40 of Figures 1 and 3.

Figure 8:
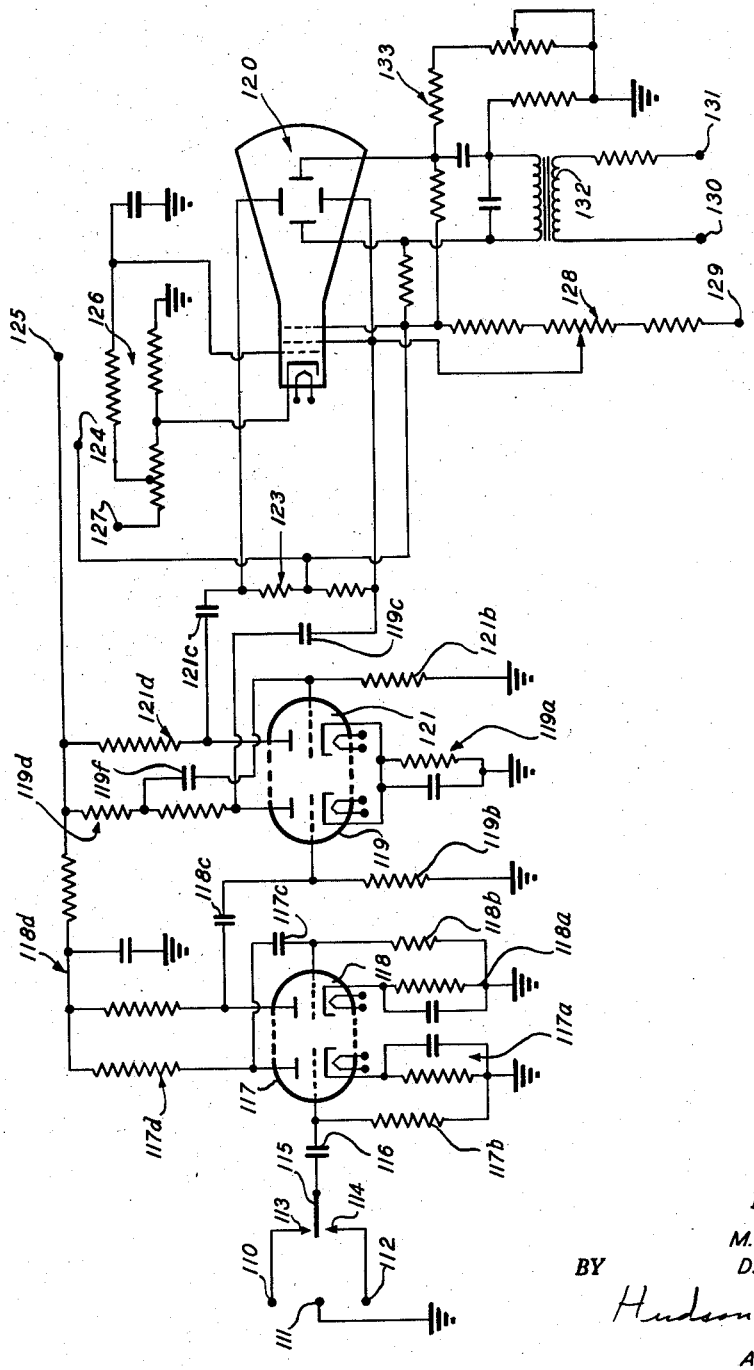
Figure 8 is a schematic circuit diagram of the null indicator.

Referring now to Figure 8, we have shown the detailed circuit of the null indicator 23, 48 or 56 of Figure 1 or null indicator 64 of Figure 3. This unit has three input terminals 110, 111, and 112, terminal 111 being grounded and terminals 110, 112 being connected to the sources of the two voltages to be compared. Terminal 110 is connected to a contact 113 and terminal 112 is connected to a contact 114 which cooperate with a vibratory reed 115 actuated by a driver coil, not shown, to oscillate at a power line frequency. The impulses from reed 115 are passed through a coupling condenser 116 to the control grid of an amplifier tube 117, the anode of which is coupled to the control grid of a second amplifier tube 118 which, in turn, is coupled to the control grid of a third amplifier tube 119. These tubes are provided, respectively, with resistance-capacitance cathode biasing networks 117a, 118a, and 119a, grid resistors 117b, 118b, and 119b, coupling condensers 117c, 118c, and 119c, and anode networks 117d, 118d, and 119d.

The voltage from the anode of tube 119 is transmitted through coupling condenser 119c to a vertical deflection plate of a cathode ray tube 120. The anode voltage from tube 119 also is transmitted through a network 119d and a coupling condenser 119f to the control grid of a phase inverter tube 121 which utilizes cathode bias network 119a and has a grid resistance 121b, an anode supply network 121d and a coupling condenser 121c from which the output is transmitted to the other vertical deflection plate of tube 120, a voltage divider network 123 being provided between the deflection plates and a positive power supply terminal 124.

Operating voltages are supplied to tubes 117 to 121, inclusive, from a power supply terminal 125 and operating potentials are supplied to the cathode and focusing grids of the cathode ray tube 120 by resistance network 126 cooperating with a negative power supply terminal 127 and a resistance network 128 cooperating with a negative power supply terminal 129. A suitable sweep voltage, preferably at power line frequency, is supplied to the horizontal deflection plates of the tube from alternating current supply terminals 130 and 131 which energize the primary winding of a transformer 132, the secondary winding of which is connected to the horizontal deflection plates through a resistance-capacitance network 133.

In operation, if the voltages applied to input terminals 110 and 112 are equal, a zero average voltage will be applied to the vertical deflection plates during successive cycles of operation, as determined by oscillation of reed 115 at power line frequency and the horizontal deflection of the electron beam of the tube at power line frequency by the sweep circuit. Therefore, the trace upon the screen will appear as a single horizontal line at the center of the screen.

Figure 9:
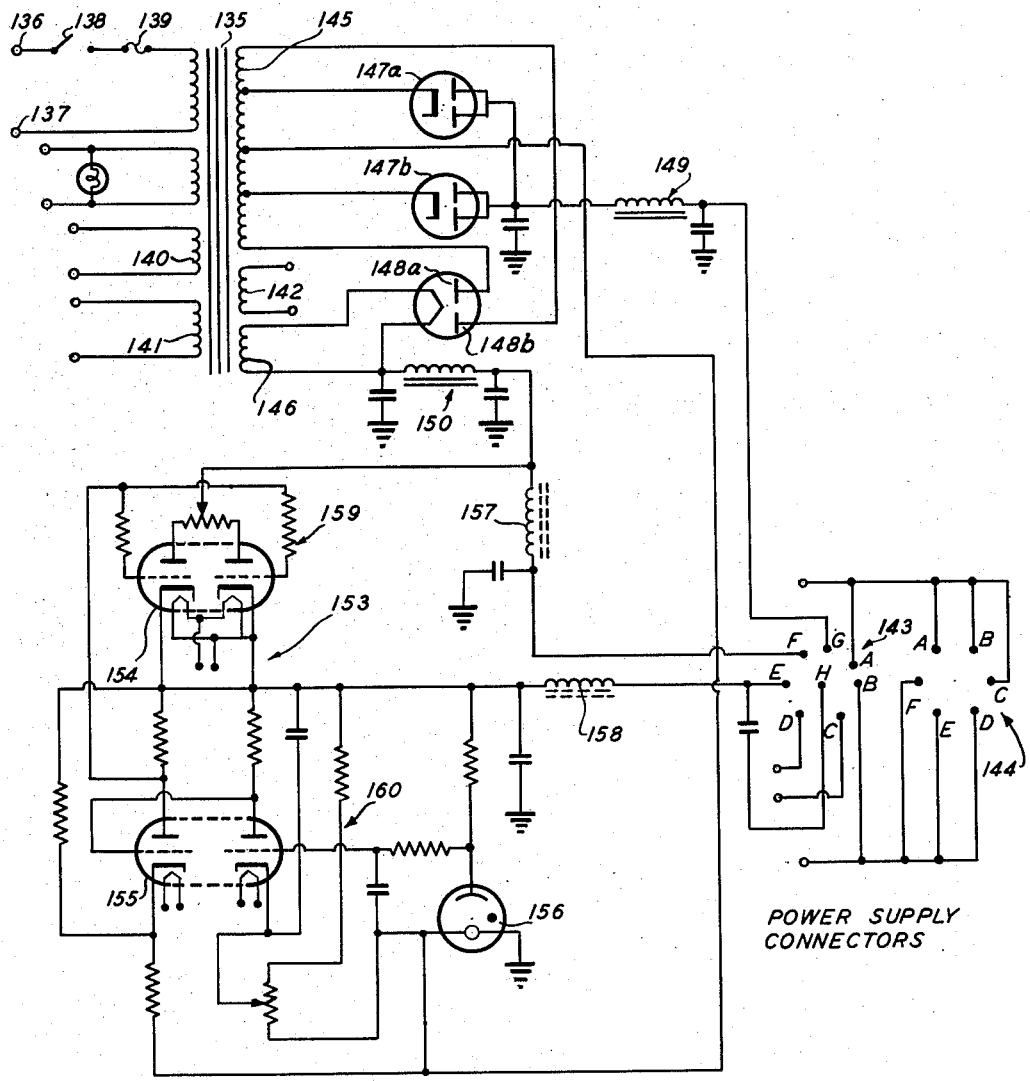
Figure 9 is a schematic circuit diagram of the power supply.

In Figure 9, we have shown the detailed circuit of a power supply unit suitable for use with the circuit of Figures 1 and 3. This circuit includes a power transformer 135 the primary winding of which is connected to supply terminals 136, 137 through a switch 138 and fuse 139. The transformer has suitable secondary windings 140, 141, and 142 for supplying filament voltages to the electronic tubes in the equipment and these filament windings are connected to prongs A, B of a plug 143 and all prongs of a plug 144 fitting into the sockets 66a and 66b of Figure 3. The transformer 135 also has a high voltage secondary winding 145 and a rectifier filament winding 146 which cooperate with two sets 147a, 147b and 148a, 148b of rectifiers with their respective filters 149 and 150 to supply a relatively high unregulated operating voltage to terminal F of plug 143 and a relatively low regulated operating voltage to terminal E. A negative bias voltage is supplied to terminal G, and alternating supply voltage is supplied to terminals C and D. Also forming a part of the power supply unit is a voltage regulator circuit 153 to provide an output of constant voltage despite load fluctuations of considerable magnitude. The circuit further includes a dual triode 154, a dual triode 155, a voltage regulator tube 156, a low pass filter 157, and a low pass filter 158 so connected in circuit with a resistance network 159 and a resistance-capacitance network 160 as to adjust the output of the power supply system in accordance with the load imposed upon the system as to maintain steady operating voltages.

In this circuit, tube 156 supplies a fixed reference voltage between the grid of the first unit of tube 155 and its cathode return. Changes in supply voltage to the load are amplified by tube 155 connected as a two stage direct current amplifier to control the voltage drop through tube 154. The result is an output voltage which is essentially independent of change in load current or line voltage.

It will be evident that we have achieved the objects of our invention in providing an improved noise thermometer circuit utilizing a primary bridge circuit with a resistance probe and probe compensating impedance so adjusted by the circuits provided that the noise output of the balancing impedance at ambient temperature is equalized with that of the probe at operating temperature and the reactance variations in the bridge circuit produced by the residual capacitance of the probe are balanced out by adjusting circuits permitting proper variation of the reactance of the probe compensating impedance. Further, after the balancing steps are carried out, a temperature measurement is taken merely by balancing the bridge circuit and noting the position of the balancing resistor upon a calibrated scale. Finally, we have provided suitable electrical circuits for accomplishing these and other objects of this invention.

While the invention has been described in connection with present, preferred embodiments thereof, it is to be understood that this description is illustrative only and is not intended to limit the invention.

We claim:

1. In a noise thermometer, in combination, a Wheatstone bridge circuit, a temperature-responsive resistive probe in the first arm of said bridge, a variable probe compensating impedance in the second arm of said bridge, means indicating the position of said variable impedance and thereby the temperature of said probe, balancing impedances in the third and fourth arms of said bridge, means for applying an alternating voltage across one pair of opposite corners of said bridge, a null indicator connectible across the other pair of opposite corners of said bridge, an input circuit, means for disconnecting said temperature-responsive probe and said probe compensating impedance from said bridge circuit and selectively connecting them to said input circuit, alternating current amplifier means incorporating a band pass filter fed by said input circuit, an auxiliary bridge circuit including a thermistor in one arm of said bridge, a potentiometer in an adjacent arm of said bridge, and a pair of fixed resistances in the remaining arms of said bridge, means for impressing a direct voltage between two opposite corners of said bridge, means for applying the output of said alternating current amplifier means to said thermistor, and a null indicator connectible to said one terminal of said thermistor and the contactor of said potentiometer.

2. A noise thermometer constructed in accordance with claim 1 in which the filter passes frequencies between 10 and 50 kilocycles.

3. In a noise thermometer, in combination, a Wheatstone bridge circuit, a temperature-responsive resistive probe in the first arm of said bridge, a variable probe compensating impedance in the second arm of said bridge, indicating means responsive to the position of said compensating impedance, balancing resistors in the third and fourth arms of said bridge, means for applying an alternating voltage across one pair of opposite corners of said bridge, a null indicator connectible across the other pair of opposite corners of said bridge, an input circuit, means for disconnecting said temperature responsive probe and said probe compensating impedance from said bridge circuit and selectively connecting them to said input circuit, alternating current amplifier means incorporating a band pass filter fed by said input circuit, a first variable resistor, means for varying the ohmic value of said resistor in accordance with the output of said alternating current amplifier means, a second variable resistor, and a null indicator coupled to both variable resistances so that the resistance of the second variable resistor can be set to correspond to the resistance of the first variable resistor as determined by the output of said alternating current amplifier means.

4. In a noise thermometer, in combination, a Wheatstone bridge circuit, a temperature-responsive resistive probe forming the first arm of said bridge, a variable probe compensating impedance forming the second arm of the said bridge, means indicating the position of said compensating impedance, balancing resistors forming the third and fourth arms of said bridge, means for applying an alternating voltage across one pair of opposite corners of said bridge, a null indicator connectible across the other pair of opposite corners of said bridge, an input circuit, means for disconnecting said temperature responsive probe and said probe compensating impedance from said bridge circuit and selectively connecting them to said input circuit, alternating current amplifier means incorporating a band pass filter fed by said input circuit, a first variable resistor, means for varying the ohmic value of said resistor in accordance with the output of said alternating current amplifier means, a second variable resistor, a null indicator coupled to both variable resistances so that the resistance of the second variable resistor can be set to correspond to the resistance of the first variable resistor as determined by the output of said alternating current amplifier means, an oscillator, means for selectively feeding the output of said oscillator to said input circuit, an adjustable phase shifting circuit connectible to the output of said alternating current amplifier means, a phase comparing circuit fed by said oscillator and said phase shifting circuit to produce an output representative of the phase difference between a signal derived from said oscillator and the output of said phase shifting circuit, and a null indicator coupled to said phase comparing circuit.

5. In a noise thermometer, in combination, a Wheatstone bridge circuit, a temperature-responsive resistive probe forming the first arm of said bridge, a variable probe compensating impedance forming the second arm of said bridge, variable balancing resistors forming the third and fourth arms of said bridge, said impedance in said resistors being adjusted so that the noise output of said balancing impedance at ambient temperature is equal to the noise output of the probe at operating temperature, a scale associated with said compensating impedance and calibrated in terms of temperature, a scale calibrated in terms of ambient temperature associated with one of said variable balancing impedances, means for applying an alternating voltage across one pair of opposite corners of said bridge, a null indicator connectible across the other pair of opposite corners of said bridge, an input circuit, means for disconnecting said temperature responsive probe and said probe compensating impedance from said bridge circuit and selectively connecting them to said input circuit, alternating current amplifier means incorporating a band pass filter fed by said input circuit, an oscillator, means for connecting the output of said oscillator to said input circuit means, an adjustable phase shifting circuit connectible to the output of said alternating current amplifier means, a phase comparing circuit fed by said oscillator and said phase shifting circuit, said phase comparing circuit producing an output representative of the phase difference between the oscillator signal and a signal derived from the output of said phase shifting circuit, said null indicator being connectible to the output of said phase comparing circuit.

6. A noise thermometer comprising a Wheatstone bridge having four arms connected in series, a resistive probe producing a noise output representative of temperature forming the first arm of said bridge, a probe compensating impedance forming the second arm of said bridge, said impedance including three variable resistance units connected in series, the first unit producing a large stepwise resistance variation responsive to adjustment thereof, the second unit producing a small stepwise resistance variation responsive to adjustment thereof, and the third resistance unit serving as a vernier adjustment, a variable condenser connected in parallel with said resistance units, the third arm of said bridge including a variable resistance adjustable in a stepwise manner, an adjustable resistance element in the fourth arm of said bridge, an input circuit, means for disconnecting said temperature-responsive probe and said probe compensating impedance from said bridge circuit and selectively connecting them to said input circuit, alternating current amplifier means incorporating a band pass filter fed by said input circuit, an auxiliary bridge circuit including a thermistor in one arm of said bridge, a potentiometer in an adjacent arm of said bridge, and a pair of fixed resistances in the remaining arms of said bridge, means for impressing a direct voltage between two opposite corners of said bridge, means for applying the output of said alternating current amplifier means to said thermistor, and a null indicator connectible to said one terminal of said thermistor and the contactor of said potentiometer, said impedance being adjusted so that the noise output thereof at ambient temperature is equal to the noise output of said probe at operating temperature, and said condenser being adjusted so that the phase angle of said impedance is equal to the phase angle of the probe resulting from its distributed capacity, and indicia associated with said compensating impedance and said variable resistance.

7. A noise thermometer comprising a Wheatstone bridge having four arms connected in series, a resistive probe producing a noise output representative of temperature forming the first arm of said bridge, a probe compensating impedance forming the second arm of said bridge, said impedance including three variable resistance units connected in series, the first unit producing a large stepwise resistance variation responsive to adjustment thereof, the second unit producing a small stepwise resistance variation responsive to adjustment thereof, and the third resistance unit serving as a vernier adjustment, a variable condenser connected in parallel with said resistance units, the third arm of said bridge including a variable resistance adjustable in a stepwise manner, an adjustable resistance element in the fourth arm of said bridge, means for applying an alternating voltage across one pair of opposite corners of said bridge, a null indicator connectible across the other pair of opposite corners of said bridge, an input circuit, means for disconnecting said temperature responsive probe and said probe compensating impedance from said bridge circuit and selectively connecting them to said input circuit, alternating current amplifier means incorporating a band pass filter fed by said input circuit, a first variable resistor, means for varying the ohmic value of said resistor in accordance with the output of said alternating current amplifier means, a second variable resistor, and a null indicator coupled to both variable resistances so that the resistance of the second variable resistor can be set to correspond to the resistance of the first variable resistor as determined by the output of said alternating current amplifier means, said impedance being adjusted so that the noise output thereof at ambient temperature is equal to the noise output of said probe at operating temperature, and said condenser being adjusted so that the phase angle of said impedance is equal to the phase angle of the probe resulting from its distributed capacity, and indicia associated with said compensating impedance and said variable resistance.

8. A noise thermometer comprising a Wheatstone bridge having four arms connected in series, a resistive probe producing a noise output representative of temperature forming the first arm of said bridge, a probe compensating impedance forming the second arm of said bridge, said impedance including three variable resistance units connected in series, the first unit producing a large stepwise resistance variation responsive to adjustment thereof, the second unit producing a small stepwise resistance variation responsive to adjustment thereof, and the third resistance unit serving as a vernier adjustment, a variable condenser connected in parallel with said resistance units, the third arm of said bridge including a variable resistance adjustable in a stepwise manner, an adjustable resistance element in the fourth arm of said bridge, an input circuit, means for disconnecting said temperature responsive probe and said probe compensating impedance from said bridge circuit and selectively connecting them to said input circuit, alternating current amplifier means incorporating a band pass filter fed by said input circuit, a first variable resistor, means for varying the ohmic value of said resistor in accordance with the output of said alternating current amplifier means, a second variable resistor, a null indicator coupled to both variable resistances so that the resistance of the second variable resistor can be set to correspond to the resistance of the first variable resistor as determined by the output of said alternating current amplifier means, an oscillator, means for selectively feeding the output of said oscillator to said input circuit, an adjustable phase shifting circuit connectible to the output of said alternating current amplifier means, a phase comparing circuit fed by said oscillator and said phase shifting circuit, and a null indicator coupled to said phase comparing circuit, said impedance being adjusted so that the noise output thereof at ambient temperature is equal to the noise output of said probe at operating temperature, and said condenser being adjusted so that the phase angle of said impedance is equal to the phase angle of the probe resulting from its distributed capacity, and indicia associated with said compensating impedance and said variable resistance.

9. A noise thermometer comprising a Wheatstone bridge having four arms connected in series, a resistive probe producing a noise output representative of temperature forming in the first arm of said bridge, a probe compensating impedance forming the second arm of said bridge, said impedance including three variable resistance units connected in series, the first unit producing a large stepwise resistance variation responsive to adjustment thereof, the second unit producing a small stepwise resistance variation responsive to adjustment thereof, and the third resistance unit serving as a vernier adjustment, a variable condenser connected in parallel with said resistance units, the third arm of said bridge including a variable resistance adjustable in a stepwise manner, an adjustable resistance element in the fourth arm of said bridge, an input circuit, means for disconnecting said temperature responsive probe and said probe compensating impedance from said bridge circuit and selectively connecting them to said input circuit, alternating current amplifier means incorporating a band pass filter fed by said input circuit, an oscillator, means for connecting the output of said oscillator to said input circuit means, an adjustable phase shifting circuit connectible to the output of said alternating current amplifier means, and a phase comparing circuit fed by said oscillator and said phase shifting circuit, said null indicator being connectible to the output of said phase comparing circuit, said impedance being adjusted so that the noise output thereof at ambient temperature is equal to the noise output of said probe at operating temperature, and said condenser being adjusted so that the phase angle of said impedance is equal to the phase angle of the probe resulting from its distributed capacity, and indicia associated with said compensating impedance and said variable resistance.

10. A bridge circuit for use in a thermal noise thermometer incorporating an alternating current amplifier which comprises, in combination, a thermistor, means for connecting the output circuit of said amplifier across said thermistor, a Wheatstone bridge incorporating said thermistor in one arm thereof, a potentiometer in an adjacent arm of said bridge, and fixed resistances constituting the other arms of said bridge, a direct current source, leads connecting one terminal of said source to the junction between said thermistor and said potentiometer and the other terminal of said source to the junction between said fixed resistances, an alternating current filter connected to the junction between said thermistor and the adjacent fixed resistance, said filter including three series connected resistances and grounded filter condensers connected to the junctions between said resistances, and a null indicator selectively connectible to the output of said filter and the contactor of said potentiometer.

11. In a method of adjusting a noise thermometer a Wheatstone bridge circuit, a temperature-responsive resistive probe in the first arm of said bridge, a probe compensating impedance in the second arm of said bridge, balancing impedances in the third and fourth arms of said bridge, means for applying an alternating voltage across one pair of opposite corners of said bridge, and a null indicator connectible across the other pair of opposite corners of said bridge, the steps which comprise amplifying and filtering the thermal noise voltages produced by said temperature responsive probe at operating temperature so as to selectively pass a band of frequencies between about 10 to 50 kilocycles, storing a quantity representative of the filtered output thereby produced, amplifying and filtering in like manner the thermal noise voltage produced by said compensating impedance at ambient temperature, comparing a quantity representative of the thereby amplified and filtered voltage with the stored quantity, varying the resistance of said compensating impedance until the quantity representative of the amplified noise output of the compensating impedance is equal to said stored quantity, impressing an alternating current signal upon said probe, storing a quantity representative of the phase shift in the alternating current signal produced by the residual capacitance of said probe, impressing said alternating current signal upon said compensating impedance, comparing a quantity representative of the phase shift thereby produced in the alternating current signal with said stored quantity, and varying the capacitance of said compensating impedance until said quantity representative of the phase shift produced by said compensating impedance is equal to the stored quantity representing the phase shift produced by the residual capacitance of said probe.

12. In a method of calibrating a noise thermometer including a Wheatstone bridge circuit, a temperature-responsive resistive probe in the first arm of said bridge, a probe compensating impedance in the second arm of said bridge, balancing impedances in the third and fourth arms of said bridge, means for applying an alternating voltage across one pair of opposite corners of said bridge, and a null indicator connectible cross the other pair of opposite corners of said bridge, the steps which comprise impressing an alternating current signal upon said probe, storing a quantity representative of the phase shift in the alternating current signal produced by the residual capacitance of said probe, impressing said alternating current signal upon said compensating impedance, comparing a quantity representative of the phase shift thereby produced in the alternating current signal with said stored quantity, and varying the capacitance of said compensating impedance until said quantity representative of the phase shift produced by said compensating impedance is equal to the stored quantity representing the phase shift produced by the residual capacitance of said probe.

13. In a noise thermometer, in combination, a Wheatstone bridge circuit, a temperature-responsive resistive probe in the first arm of said bridge, a probe compensating impedance in the second arm of said bridge, a first balancing resistor in the third arm of said bridge, and a second balancing resistor in the fourth arm of said bridge, alternating current amplifier means including a preamplifier, a band pass filter fed by said preamplifier, and a final amplifier fed by said band pass filter, a null indicator, an auxiliary bridge circuit including a thermistor in one arm of the bridge, a potentiometer in an adjacent arm of the bridge, and a pair of fixed resistances defining the remaining arms of said bridge, means for impressing a direct voltage between two opposite corners of said auxiliary bridge, an alternating current filter having an input circuit connected to the junction between said thermistor and the adjacent fixed resistance, a multi-gang switch having at least three positions, leads cooperating with said switch and the previously-identified circuit elements so that; with the switch in position (1), the input circuit of said amplifier means is connected to said probe, the probe is disconnected from the Wheatstone bridge circuit, the output of said amplifying means is impressed upon said thermistor, and the null indicator has one terminal connected to the contactor of said potentiometer and its other terminal connected to the output of said alternating current filter; with the switch in position (2), the input of said amplifier is coupled to said probe compensating impedance, and said impedance is disconnected from the Wheatstone bridge circuit, the circuit connections otherwise remaining the same as claimed in connection with switch position (1); and with the switch in position (3), the input circuit of the amplifier is disconnected, an alternating current source has one terminal connected to the junction between said second balancing resistor and said probe with its other terminal connected to the junction between said first balancing resistor and said probe compensating impedance, and said null indicator has one terminal connected to the junction between said balancing resistors with its other terminal connected to the junction between said temperature responsive probe and said probe compensating impedance.

14. In a noise thermometer, in combination, a Wheatstone bridge circuit, a temperature-responsive resistive probe in the first arm of said bridge, a probe compensating impedance in the second arm of said bridge, a first balancing impedance in the third arm of said bridge, and a second balancing impedance in the fourth arm of said bridge, alternating current amplifier means including a preamplifier, a band pass filter fed by said preamplifier, and a final amplifier fed by said band pass filter, a null indicator, an auxiliary bridge circuit including a thermistor in one arm of said bridge, a potentiometer in an adjacent arm of said bridge, and a pair of fixed resistances defining the remaining arms of said bridge, a direct current source having one terminal connected to the junction between said thermistor and said potentiometer, the other terminal of the current source being connected to the junction between said fixed resistances, an alternating current filter having an input circuit connected to the junction between said thermistor and the adjacent fixed resistance, an oscillator, an adjustable phase shifting circuit, a phase comparing circuit coupled to said phase shifting circuit and said oscillator whereby the output of the comparing circuit is representative of the phase difference between the signal produced by the phase shifting circuit and the signal produced by said oscillator, a multi-gang switch having at least five positions, and leads cooperating with said switches and the circuit components previously identified in such fashion that; with the switch in position (1), the oscillator is de-energized, the input circuit of said amplifier means is coupled to said probe, the probe is disconnected from the Wheatstone bridge circuit, the output of said amplifier means is coupled to said auxiliary bridge circuit at the junction between said thermistor and the adjacent fixed resistance, and the null indicator has one terminal connected to the contactor of said potentiometer and its other terminal connected to the output of said alternating current filter; with the switch in position (2), the input circuit of said amplifier means is coupled to said probe compensating impedance, and said impedance is disconnected from the Wheatstone bridge circuit, the connections otherwise being the same as claimed in connection with switch position (1); with the switch in position (3), the input circuit of said amplifier means is coupled to said probe, the probe is disconnected from the Wheatstone bridge circuit, the oscillator is energized, a portion of the oscillator output is fed to the input circuit of said amplifier means, the output of the amplifier means is fed to said phase shifting circuit, and said null indicator is coupled to the output of said phase comparing circuit; with the switch in position (4), the input circuit of the amplifier means is coupled to the probe compensating impedance, and said impedance is disconnected from the Wheatstone bridge circuit, the connections otherwise being the same as claimed in connection with switch position (3); and with the switch in position (5), the oscillator is deenergized, the input circuit of said amplifier means is disconnected, an alternating current source has one terminal connected to the junction between said probe and said second balancing impedance, the other terminal being connected to the junction between said first balancing impedance and said probe compensating impedance, and the null indicating device has one terminal connected to the junction between said balancing impedances, the other terminal of said null indicator being connected to the junction between said probe and said probe compensating impedance.

15. A bridge circuit for use in a thermal noise thermometer incorporating an alternating current amplifier which comprises, in combination, a resistance, means for connecting the output circuit of said amplifier across said resistance, a thermocouple in thermal contact with said resistance, a potentiometer, means for impressing a direct voltage across the fixed terminals of said potentiometer, a null-indicating device, and means alternately operatively connecting said null indicating device to said thermocouple and the contactor of said potentiometer.

References Cited in the file of this patent
UNITED STATES PATENTS

| 1,563,053 | Weatherwax | Nov. 24, 1925 |
| 1,840,635 | Parker | Jan. 12, 1932 |
| 2,094,207 | Eaton | Sept. 28, 1937 |
| 2,577,543 | Saad | Dec. 4, 1951 |

OTHER REFERENCES

Article: "An Absolute Noise Thermometer for High Temperatures and Pressures," by Garrison and Lawson, published in Review of Scientific Instruments, vol. 20, No. 11, November 1949.